US012761726B2

(12) United States Patent
Cao

(10) Patent No.: US 12,761,726 B2
(45) Date of Patent: Oct. 13, 2026

(54) METHOD AND APPARATUS FOR INTERACTION IN VIRTUAL REALITY SCENE, DEVICE AND STORAGE MEDIUM

(71) Applicant: Beijing Zitiao Network Technology Co., Ltd., Beijing (CN)

(72) Inventor: Jinyuan Cao, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 19/159,258

(22) PCT Filed: Feb. 5, 2024

(86) PCT No.: PCT/CN2024/075953

§ 371 (c)(1),
(2) Date: Aug. 22, 2025

(87) PCT Pub. No.: WO2024/174861

PCT Pub. Date: Aug. 29, 2024

(65) Prior Publication Data

US 2026/0236091 A1 Aug. 13, 2026

(30) Foreign Application Priority Data

Feb. 24, 2023 (CN) ........................ 202310195788.5

(51) Int. Cl.
*G06T 19/00* (2011.01)
*G06F 3/01* (2006.01)
(Continued)

(52) U.S. Cl.
CPC .............. *G06F 3/012* (2013.01); *G06F 3/017* (2013.01); *G06F 3/04815* (2013.01)

(58) Field of Classification Search
CPC ....... G06F 3/012; G06F 3/017; G06F 3/04815
See application file for complete search history.

(56) References Cited

U.S. PATENT DOCUMENTS

2018/0113599 A1 4/2018 Yin
2020/0320793 A1* 10/2020 Marcolina .............. G06F 3/017
2020/0409481 A1 12/2020 Henrikson et al.

FOREIGN PATENT DOCUMENTS

CN 107024981 A 8/2017
CN 108874139 A 11/2018
(Continued)

OTHER PUBLICATIONS

ISA China National Intellectual Property Administration, International Search Report and Written Opinion Issued in Application No. PCT/CN2024/075953, Apr. 24, 2024, WIPO, 14 pages.
(Continued)

*Primary Examiner* — Deeprose Subedi
(74) *Attorney, Agent, or Firm* — Alleman Hall LLP

(57) ABSTRACT

Provided are a method and apparatus for interaction in a virtual reality scene, a device and a storage medium. The method comprises: receiving head control data acting in a virtual reality scene; determining a region of interest on the basis of the head control data and displaying the region of interest and a control point, the control point being initially located at the center point of the region of interest, and the region of interest comprising an object to be interacted with; receiving hand pose data generated in a hand operation area, a displacement mapping relationship being present between the hand operation area and the region of interest; moving the control point to a target display position, the target display position being a mapping position of the hand pose data in the region of interest; and responding to an interaction operation generated when the control point acts on said object.

20 Claims, 6 Drawing Sheets

(51) Int. Cl.

| | |
|---|---|
| ***G06F 3/04815*** | (2022.01) |
| ***G06K 9/00*** | (2022.01) |
| ***G06T 19/20*** | (2011.01) |

(56) References Cited

FOREIGN PATENT DOCUMENTS

| | | | |
|---|---|---|---|
| CN | 112835445 | A | 5/2021 |
| CN | 114647304 | A | 6/2022 |
| CN | 115145395 | A | 10/2022 |
| CN | 115167668 | A | 10/2022 |
| CN | 115346027 | A | 11/2022 |
| CN | 115480639 | A | 12/2022 |
| CN | 116048281 | A | 5/2023 |
| WO | 2015133889 | A1 | 9/2015 |
| WO | 2022207821 | A1 | 10/2022 |

OTHER PUBLICATIONS

China National Intellectual Property Administration, Office Action and Search Report Issued in Application No. 202310195788.5, Jan. 26, 2026, 18 pages.

* cited by examiner

METHOD AND APPARATUS FOR INTERACTION IN VIRTUAL REALITY SCENE, DEVICE AND STORAGE MEDIUM

CROSS-REFERENCE TO RELATED APPLICATIONS

The present application is a national phase application of PCT/CN2024/075953 filed Feb. 5, 2024, which claims priority to and is based on a Chinese application with an application No. 202310195788.5 and a filing date of Feb. 24, 2023, the aforementioned applications are hereby incorporated by reference in their entireties.

TECHNICAL FIELD

Embodiments of the present disclosure relate to the field of virtual reality technology, and more particularly to a method and an apparatus for interaction in a virtual reality scene, a device, and storage medium.

BACKGROUND

Virtual reality (VR) technology has been gradually applied to people's lives. VR can utilize electronic devices to simulate and produce three-dimensional virtual reality scenes, and can present them to users through virtual reality devices (such as virtual reality glasses, virtual reality helmets, etc.), providing an immersive experience in vision, hearing, touch or other senses.

Different from two-dimensional interactions on mobile terminals, desktop computers and other devices, interactions in virtual reality scenes often obtain more stereoscopic input through non-contact interactions such as gestures, handles, head movements, eye movements and so on.

SUMMARY

The present disclosure provides a method and an apparatus for interaction in a virtual reality scene, a device and storage medium, to achieve combined interaction in the virtual reality scene and improve the convenience of interaction.

In a first aspect, an embodiment of the present disclosure provides an method for interaction in a virtual reality scene, and the method for interaction in the virtual reality scene may include:

receiving head control data for acting in the virtual reality scene;

determining a region of interest based on the head control data, and displaying the region of interest and a control point in the virtual reality scene, wherein the control point is initially located at a set position of the region of interest, and the region of interest includes an object to be interacted with;

receiving hand posture data generated in a hand operation region, wherein there is a displacement mapping relationship between the hand operation region and the region of interest;

moving the control point to a target display position, wherein the target display position is a mapping position of the hand posture data in the region of interest;

responding to an interactive operation generated when the control point acts on the object to be interacted with.

In a second aspect, an embodiment of the present disclosure further provides an apparatus for interaction in a virtual reality scene, the apparatus for interaction in the virtual reality scene may include:

a first receiving module, configured to receive head control data for acting in the virtual reality scene;

a first display module, configured to determine a region of interest based on the head control data, and display the region of interest and a control point in the virtual reality scene, wherein the control point is initially located at a set position of the region of interest, and the region of interest includes an object to be interacted with;

a second receiving module, configured to receive hand posture data generated in a hand operation region, wherein there is a displacement mapping relationship between the hand operation region and the region of interest;

a second display module, configured to move the control point to a target display position, wherein the target display position is a mapping position of the hand posture data in the region of interest;

a first response module, configured to respond to an interactive operation generated when the control point acts on the object to be interacted with.

In a third aspect, an embodiment of the present disclosure further provides an electronic device, the electronic device comprising:

one or more processors;

a storage device for storing one or more programs, wherein the one or more programs, when executed by the one or more processors, cause the one or more processors to implement the method for interaction in a virtual reality scene as described in any embodiment of the present disclosure.

In a fourth aspect, an embodiment of the present disclosure further provides a storage medium comprising computer executable instructions, which, when executed by a computer processor, are used to execute the method for interaction in a virtual reality scene as described in any embodiment of the present disclosure.

In a fifth aspect, an embodiment of the present disclosure further provides a computer program product, comprising instructions, which, when executed by a processor, are used to execute the method for interaction in a virtual reality scene as described in any embodiment of the present disclosure.

In a sixth aspect, an embodiment of the present disclosure further provides a computer program, comprising program codes, which, when executed by a processor, are used to execute the method for interaction in a virtual reality scene as described in any embodiment of the present disclosure.

BRIEF DESCRIPTION OF THE DRAWINGS

The above and other features, advantages and aspects of various embodiments of the present disclosure will become more apparent when taken in conjunction with the drawings and with reference to the following detailed description. Throughout the drawings, the same or similar reference numbers refer to the same or similar elements. It should be understood that the drawings are schematic and that the components and elements are not necessarily drawn to scale.

DETAILED DESCRIPTION

Figure 1:
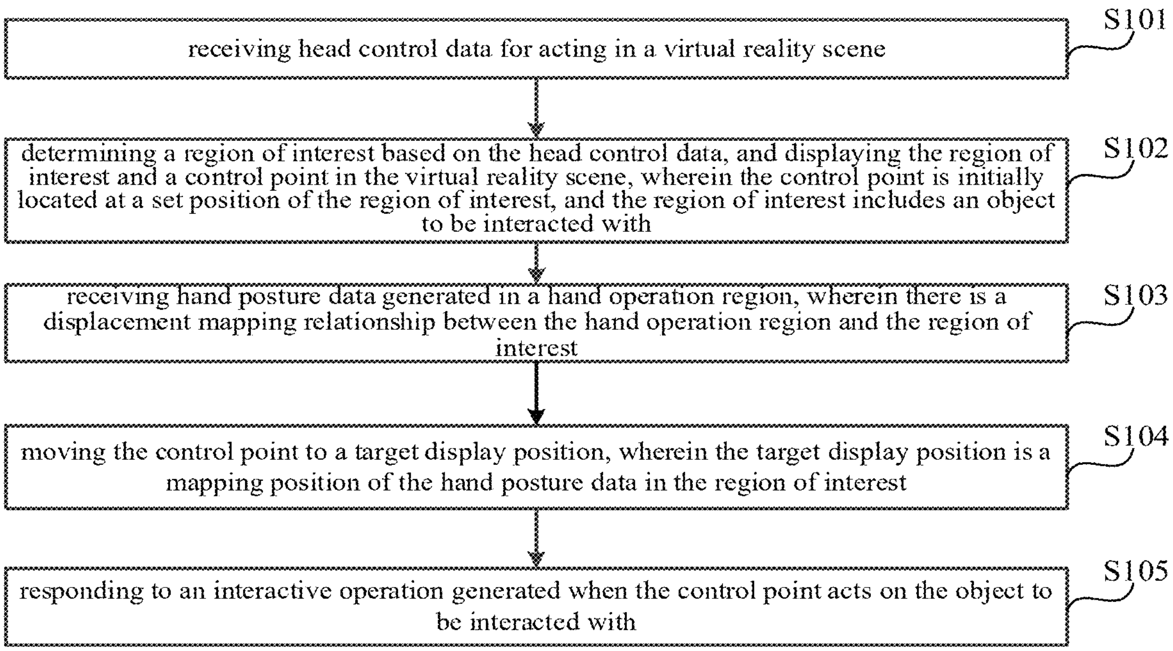
FIG. 1 is a schematic flow chart of an method for interaction in a virtual reality scene provided by an embodiment of the present disclosure.

Embodiments of the present disclosure will be described in more detail below with reference to the accompanying drawings. Although some embodiments of the present disclosure are shown in the drawings, it should be understood that the present disclosure can be embodied in various forms and should not be construed as being limited to the embodiments set forth here, but rather, these embodiments are provided for a more thorough and complete understanding of the present disclosure. It should be understood that the drawings and embodiments of the present disclosure are only used for illustrative purposes, and are not used to limit the protection scope of the present disclosure.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect.

As used herein, the term "including" and its variants are open-ended including, that is, "including but not limited to". The term "based on" is "at least partially based on"; the term "one embodiment" means "at least one embodiment"; the term "another embodiment" means "at least one other embodiment"; the term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order or interdependence of the functions performed by these devices, modules or units.

It should be noted that the modifications of "a" and "a plurality" mentioned in the present disclosure are schematic rather than limiting, and those skilled in the art should understand that unless the context clearly indicates otherwise, they should be understood as "one or more".

Names of messages or information exchanged among multiple devices in the embodiments of the present disclosure are only used for illustrative purposes, and are not used to limit the scope of these messages or information.

It may be understood that before using the technical solutions disclosed in the embodiments of the present disclosure, a user should be informed of the type, range of usage, usage scenario, etc. of personal information involved in the present disclosure in an appropriate manner in accordance with relevant laws and regulations, and the authorization of the user should be obtained.

For example, in response to receiving an active request from a user, prompt information is sent to the user to clearly inform the user that the operation requested to be performed will require access to and usage of the user's personal information. In this way, the user may independently choose whether to provide the personal information to software or hardware such as an electronic device, an application, a server, or a storage medium that performs the operation of the technical solution of the present disclosure according to the prompt information.

As an alternative but non-limiting implementation, in response to receiving an active request from the user, the prompt information may be sent to the user in the form of a pop-up window, for example, and the prompt information may be presented in text in the pop-up window. In addition, the pop-up window may further include a selection control for the user to choose whether to "agree" or "disagree" to provide the personal information to the electronic device.

It may be understood that the above process of notifying and acquiring the authorization from the user is merely illustrative and is not intended to limit the implementations of the present disclosure. Other manners that satisfy the requirements of relevant laws and regulations may also be applied to the implementations of the present disclosure.

In addition, it may be understood that the data involved in the technical solution (including but not limited to the data itself, the acquisition of the data, or the usage of the data) should comply with the requirements of corresponding laws, regulations, and related provisions.

It should be pointed out that currently, interaction is often achieved in a scene interface only through one kind of input manner, such as gesture, handle, head movement, and eye movement. However, existing interaction manners have the following problems: 1) There is a problem of low accuracy, when a presented two-dimensional plane interface is far away from a player's virtual character, it is difficult to select a relatively small button or control on the presented interface, which affects the interaction accuracy; 2) There is a problem of interaction fatigue, when performing interaction by using a certain interaction manner for a long time in a scene (such as using a handle to control a progress bar to browse a virtual web page interface), the corresponding body part under this interaction manner needs to maintain a state all the time, or repeat an action, which can easily cause interaction fatigue to the player. All of the above issues will affect the player's immersive experience.

It should be noted that in existing interaction in the virtual reality scene, control data input is often performed only through one of gesture, handle, head movement or eye movement. For example, mainstream virtual reality glasses often use a handle as a default interaction manner, and ray interaction in the handle is the most commonly used, in a virtual reality scene, based on the ray interaction performed by the handle, the virtual reality device can receive data information fed back by the handle and generate rays in visual effects, the handle will have corresponding projections in the virtual reality scene and can present a virtual handle, a player can manipulate the virtual handle, which is equivalent to holding a laser pen in a real space scene and being able to point to an object to be selected in the virtual reality scene through the rays of the virtual handle. Although this interaction manner can give players a more intuitive experience, the problem with this interaction method is that it requires the hands to keep raised, and the arm or hand muscles are easily fatigued; in addition, ray interaction mainly uses the conversion of angle data to plane, the farther the interaction object is from the player, the greater the movement change corresponding to each angle change of the ray is, making it difficult to accurately select an interaction object.

For another example, in virtual reality scenarios, interaction can also be achieved through eye or head movements, however, these interaction manners also have problems with interaction fatigue and low interaction accuracy, in addition, the interaction manners are also subject to some scene limitations, some scene interactions cannot be achieved solely through data generated by head or eye movements.

In view of this, an embodiment of the present application provides an interaction method which can perform interaction in a virtual reality scene by combining multiple input modes. FIG. 1 is a flow chart of an method for interaction in a virtual reality scene provided by an embodiment of the present disclosure. The embodiment of the present disclosure is applicable to situations where interaction is performed in a virtual reality scene, the method can be executed by an apparatus for interaction in the virtual reality scene, the apparatus can be implemented in the form of software and/or hardware, optionally, it can be implemented by an electronic device, the electronic device is preferably a virtual reality device, such as virtual reality glasses, a virtual reality helmet, etc.

As shown in FIG. 1, the method of an embodiment of the present disclosure may specifically include:

S101. receiving head control data for acting in a virtual reality scene.

In this embodiment, the virtual reality scene can be considered as a scene image presented to a player through a virtual reality device using virtual reality technology. Different virtual reality scenes can be presented based on different choices made by players. Exemplarily, a virtual reality scene may be a game scene selected for entrance, or it may be an information browsing scene, the information browsing scene may be a window interface presented remotely, or it may be multiple window interfaces, the window interface may be a menu interface, a web page interface, and the like.

In this embodiment, it can be considered that the player enters any virtual reality scene by selection, and the virtual reality device as the execution subject of the method provided in this embodiment can present a scene picture of the virtual reality scene selected by the player.

In this embodiment, the head control data can be specifically considered as data captured by an eye movement acquisition device or a head movement acquisition device. The head control data can be the line-of-sight data captured by the eye movement acquisition device when the player's eyes move, or it can be the head posture data captured by the head movement acquisition device when the player's head moves. This step can receive head posture data or line-of-sight data generated when the head moves and/or the eyes move.

S102: determining a region of interest based on the head control data, and displaying the region of interest and a control point in the virtual reality scene, wherein the control point is initially located at a set position of the region of interest, and the region of interest includes an object to be interacted with.

In this embodiment, the received head control data can be converted into posture information in a virtual space, for example, information, such as, the player's orientation, position, etc., in the virtual reality scene, can be determined, and information such as the player's line-of-sight direction, etc. can be determined. In the virtual reality scene, there may exist a visualization or visualization window interface, such as flowers, trees, buildings or other game characters in the game, map and other scenes, and the menu window interface and web page window interface in the information browsing scene, the presented scenery or window interface includes interaction objects for players to interact with, such as attacked objects, game props, equipment, etc., and various buttons and controls in the window interface.

In this step, the orientation information or light of sight information in the head control data can be used to roughly determine a range area in the virtual reality scene that the player is currently concerned about. In this embodiment, the range area can be labelled as a region of interest and displayed in a visual form, the displayed region of interest can be a circular or quadrilateral planar region, and in principle, the region of interest cannot affect the display of other sceneries in the virtual reality scene, in this step, the presentation of the region of interest can be weakened by increasing transparency. Meanwhile, there is a corresponding center point in the region of interest, in this embodiment, a control point may be displayed at the center point of the region of interest in a visual form, it can also be considered that the control point is initially presented at the center point of the region of interest.

It should be noted that the head control data received in this embodiment may include head posture data and line-of-sight data, in this step, one of them (such as head posture data or line-of-sight data) can be selected to determine the region of interest; or such two types of data can be combined to determine the region of interest.

In one implementation, the orientation of the player in the virtual reality scene can be determined by head posture data. In this embodiment, a scene area with a set range can be delineated along the orientation direction as a region of interest, wherein the set range can be set according to the player's viewing angle range, and it is ensured that the set range is not larger than the viewing angle range.

In another implementation, the line-of-sight direction of the player's eyes in the virtual reality scene can be determined by line-of-sight data. In this embodiment, a scene area with a set range can be delineated along the line-of-sight direction as the region of interest. It can be known that the present embodiment can also combine the head posture data and the line-of-sight data, firstly determine a delineation direction of the region of interest in the virtual reality scene based on the orientation direction in the head posture data, and then determine the position of the region of interest based on the line-of-sight direction in the line-of-sight data.

In addition, it should be noted that in this embodiment, the purpose of delineating the region of interest according to head control data is to roughly locate a certain object to be interacted with, wherein the object to be interacted with can be considered as a certain scenery presented in the virtual reality scene or a certain button/control in the presented window interface. The head control data received in the above steps can be regarded as data captured by a corresponding capture device when a player pays attention to a certain object to be interacted with, and these data indirectly reflect the position of the object to be interacted with in the virtual reality space.

Continuing with the above description, for a player, after selecting an interaction object to be triggered in the displayed virtual reality scene, the player can project his/her sight onto the interaction object to be triggered through eye movement, or can turn his/her face toward the interaction object to be triggered through head movement. For the virtual reality device, the eye movement acquisition device and the head movement acquisition device that are matched with the virtual reality device will capture the line-of-sight data and the head posture data accordingly. The captured data can be used as head control data, and the data receipt can be realized through the above-mentioned step S101 of this embodiment.

Therefore, it can be considered that the region of interest determined by this embodiment includes the objects to be interacted with for which the player expects to perform interactive operations. The region of interest and center point presented in this step can be regarded as the visual effects in the interaction implementation, which can give players a better sensory experience in the interaction.

Figure 1A:
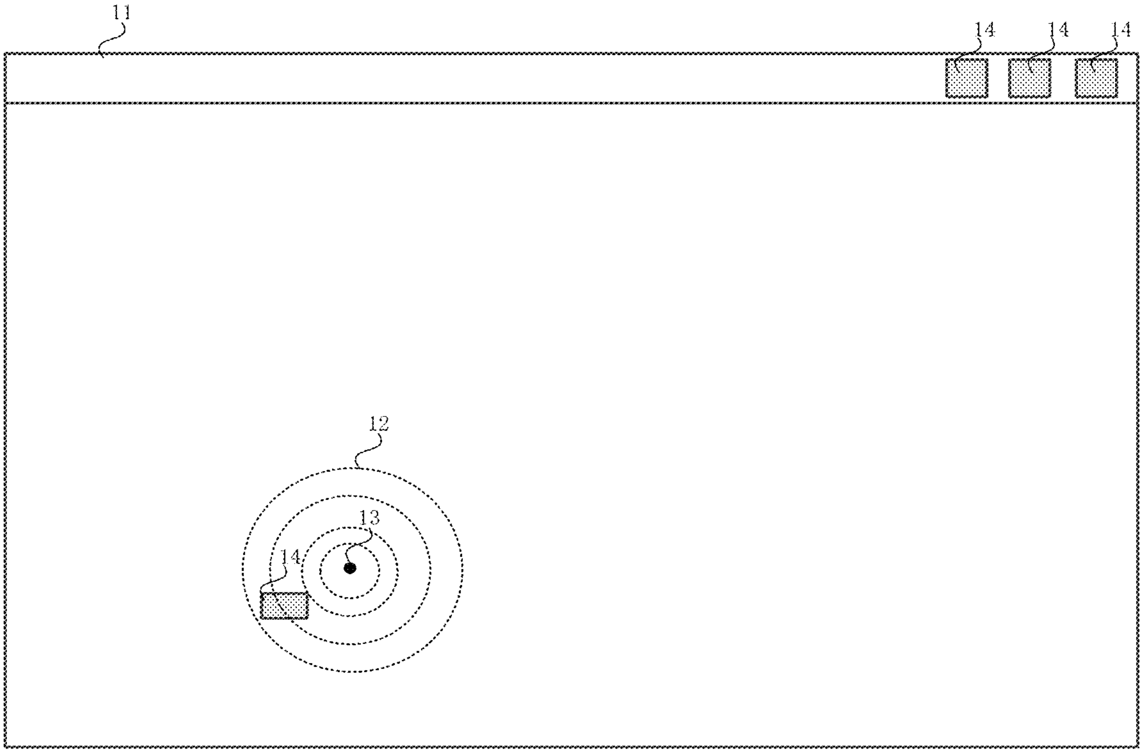
FIG. 1*a* shows an effect display diagram of a region of interest and a control point generated during execution of the method for interaction in the virtual reality scene provided by the present embodiment.

Exemplarily, FIG. 1*a* shows an effect display diagram of a region of interest and a control point generated during execution of the method for interaction in the virtual reality scene provided by the present embodiment. As shown in FIG. 1*a*, the presented virtual reality scene can be a window interface 11, in which a region of interest 12 is displayed, a control point 13 is initially located at the center point of the region of interest 12, the region of interest 12 also includes an object to be interacted with 14 that the player expects to interact with. The object to be interacted with 14 is preferably displayed as a virtual button.

S103: receiving hand posture data generated in a hand operation region, wherein there is a displacement mapping relationship between the hand operation region and the region of interest.

In this embodiment, this step can receive hand posture data, and the hand posture data can be considered as data formed by projecting the player's hand motion within a constructed hand operation region. Among them, the hand posture data can be obtained by projection of the data captured by the hand gesture capture device, the captured data may specifically be data generated by capturing the player's hand motion. The captured data can be data in 6dof format, which can be projected into the hand operation region to form the hand posture data in a two-dimensional manner.

Among them, the hand gesture capture device can preferably be a handle that is matched with the virtual reality device, when the player holds the handle for hand activity, the handle can capture the player's hand motion and form corresponding 6dof data, correspondingly, the handle can present a virtual handle in the virtual reality scene screen.

In this embodiment, the hand operation region can be considered as a virtual plane area constructed with a current position of the virtual handle as the center, which can be displayed near the virtual handle in the virtual reality scene screen in a visual form, or, which may be not displayed in the virtual reality scene screen in a visual form, but be associated with the active area of the player's hand in the real space at a logical level. When the hand operation region is constructed, a circular or quadrilateral plane area may be formed with the current position of the hand as the center, and the radius of the circle or the length and width of the quadrilateral may be preset values.

Continuing with the above description, the executive function of the hand operation region can be equivalent to a mouse control area or a touch panel as the input device of the computer device in the real space, the handle can correspond to the mouse active in the mouse control area, or to the finger or touch object active in the touch panel, in the computer device in the real space, the cursor on the screen interface can move accordingly with the activity of the mouse or the touch activity for the touch panel.

In this embodiment, the purpose of constructing the hand operation region can be that as the player manipulates the handle to move within the hand operation region, the control point presented in the virtual reality scene can also move within the region of interest. The key to ensure the control point moving within the region of interest is to establish a displacement mapping relationship between the constructed hand operation region and the region of interest. Among them, the displacement mapping relationship between the hand operation region and the region of interest can be similar to a movement mapping relationship between the mouse control area or touch panel and the screen interface of the computer device in the real space. Through the displacement mapping relationship, the movement in the hand operation region can be mapped to the movement of the control point in the region of interest.

S104: moving the control point to a target display position, wherein the target display position is a mapping position of the hand posture data in the region of interest.

In this embodiment, information about the position of the handle in the hand operation region can be determined based on the hand posture data received as mentioned above, and the mapping position of the position information in the region of interest can be determined based on the displacement mapping relationship between the hand operation region and the region of interest, the mapping position can be regarded as a target display position of the control point, this step can move the control point from an original display position to the target display position, wherein the original display position of the control point can be an initial center point position of the region of interest, or it can be a historical display position of the control point presented as the handle moves.

It should be noted that, in this embodiment, the above S103 and S104 can be steps that can be executed continuously and iteratively, as long as the handle moves in the hand operation region, S103 can receive the hand posture data in real time, correspondingly, this step can determine the corresponding mapping position in the region of interest in real time based on the hand posture data received in real time by S103, and can move the control point in real time based on the mapping position. Similarly, when the handle stays at a corresponding position in the hand operation region, the control point will also move to and stay at the mapping position in the region of interest corresponding to the position.

Figure 1B:
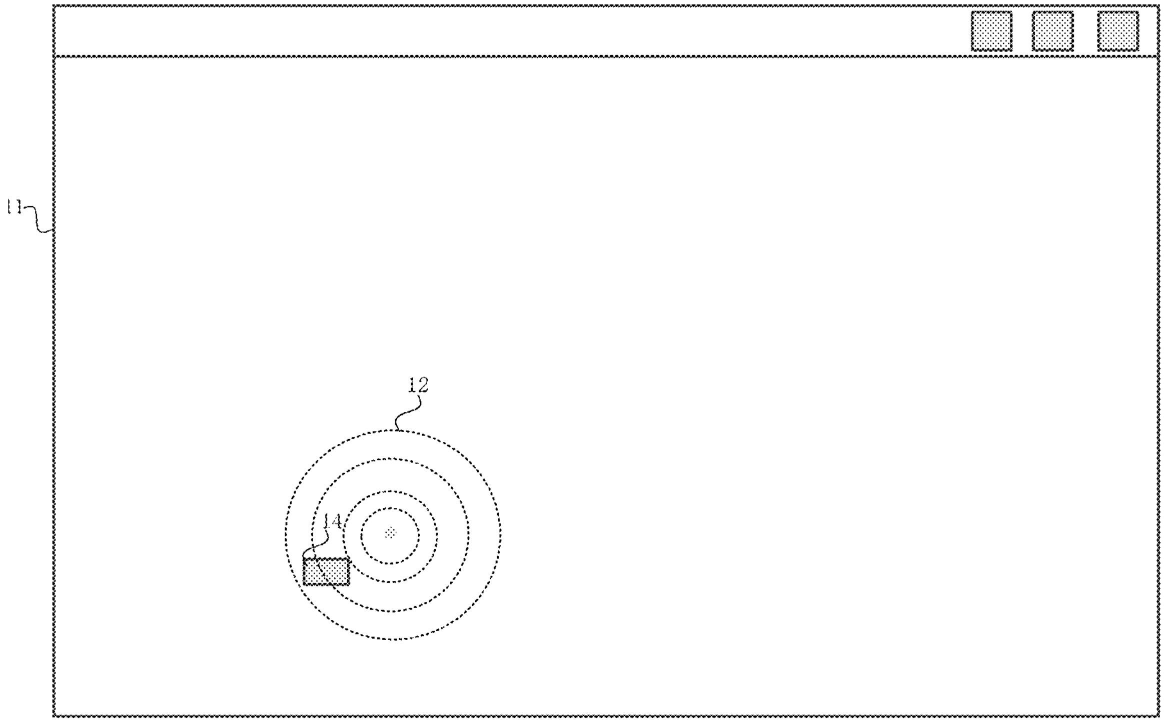
FIG. 1*b* shows an effect display diagram of moving a control point to a target display position during execution of the method for interaction in a virtual reality scene provided by the present embodiment.

Exemplarily, FIG. 1*b* shows an effect display diagram of moving a control point to a target display position during execution of the method for interaction in a virtual reality scene provided by the present embodiment. As shown in FIG. 1*b*, the virtual reality scene can also a window interface 11, in which a region of interest 12 is presented, a control point 13 can move by changes in the received hand posture data, and its movement trajectory can be represented by a first trajectory line 15, it can be seen that the control point 13 eventually stays at a triggerable position of an object to be interacted with 14, in this example, the hand operation region used for movement of hand posture data is considered to be a non-visual region, where it is not displayed, but only data interaction at the logical level exists, meanwhile, FIG. 1*b* does not show the relevant description of the virtual handle.

S105: responding to an interactive operation generated when the control point acts on the object to be interacted with.

In this embodiment, after roughly positioning the object to be interacted with locked by the player through a head control area to form a region of interest, the object to be interacted with can be finely positioned by moving the control point in the region of interest.

Exemplarily, in this embodiment, under the manipulation of the player on the handle, the control point can be moved to the presentation position of the object to be interacted with, or to a trigger component associated with the presentation of the object to be interacted with, through the above S103 and S104. After the control point is at a position associated with the object to be interacted with, the manipulation of the player on the handle can be converted into a triggering behavior acting on the object to be interacted with, and the triggering behavior can be click, drag, slide, etc.

In this embodiment, by analyzing the triggering behavior acting on the object to be interacted with, a corresponding interactive operation can be generated, this step can respond to the generated interactive operation, for example, executing a functional logic corresponding to the click operation, or executing the functional logic corresponding to the drag operation, etc.

When there is a need to interact with the virtual reality scene, the method for interaction in a virtual reality scene provided by an embodiment of the present disclosure can roughly determine a region of interest in the virtual reality scene based on the player's head control data (such as head posture data or line-of-sight data), and then perform fine selection based on a control point mapped from the hand posture data in the region of interest. Different from the existing interaction solutions, the present technical solution combines head control data with hand posture data to achieve interaction in a virtual reality scene in a combined form, which can effectively solve the problem of interaction fatigue of body parts caused by a single interaction; meanwhile, the technical solution can first narrow an interaction range to locate the region of interest and then accurately select an interaction objects such as a button or a control, etc. in the region of interest through a control point, which can reduce the risk of difficult in accurately selecting interaction objects, and improve the interaction accuracy, thereby enhancing the player's immersive experience in the virtual reality scene.

As a first alternative embodiment of the embodiment of the present disclosure, based on the above embodiments, the above method for interaction in the virtual reality scene can be further optimized, which can specifically include the following steps:

a1) controlling the region of interest to move in the virtual reality scene as the received head control data changes;

In this embodiment, as the player's eye movements or head movements occur, the line-of-sight data or head posture data captured by the corresponding eye movement acquisition device or head movement acquisition device will also change, this embodiment can record the line-of-sight data and/or head posture data as head control data, and this embodiment can receive the changed head control data. Based on the association between the head control data and the region of interest described above, when the changed head control data is received, this step can redefine its corresponding region of interest, and present the re-determined region of interest in the virtual reality scene.

Considering that the re-determined region of interest has not been changed in region size and presentation form, it is equivalent to the presentation position of the region of interest moving with head movement and/or eye movement at the visual level. Meanwhile, it can be known that this embodiment can determine movement attribute information of the region of interest, such as the moving distance of the region of interest relative to the previous position and the moving speed when moving. In addition, unlike the region of interest which moves in real time with the real-time change of the head control data, the control point initially presented at the center point of the region of interest moves for various situations accordingly.

Exemplarily, to prevent input jitter caused by head movement and/or eye movement, the control point can determine whether to follow the center point of the region of interest to move based on the movement attribute information of the region of interest after the movement relative to the previous region of interest.

Continuing with the above description, this embodiment obtains a movement attribute value associated with the moving distance and moving speed of the region of interest according to the determined movement attribute information when the region of interest moves, this step can compare the movement attribute value with a preset threshold.

b1) in response to the movement attribute value of the region of interest after movement being less than a set threshold, keeping a display position of the control point unchanged.

Specifically, if the movement attribute value is less than the set threshold, this step can be used to continue to keep the control point unchanged at the display position before the region of interest moves.

c1) in response to the movement attribute value being greater than or equal to the set threshold, resetting the control point to a center point of the region of interest after movement.

Specifically, if the movement attribute value is greater than or equal to the set threshold, this step can be used to control the movement of the display position of the control point, and specifically reset the control point to be display at the center point of the region of interest after the movement.

Figure 1C:
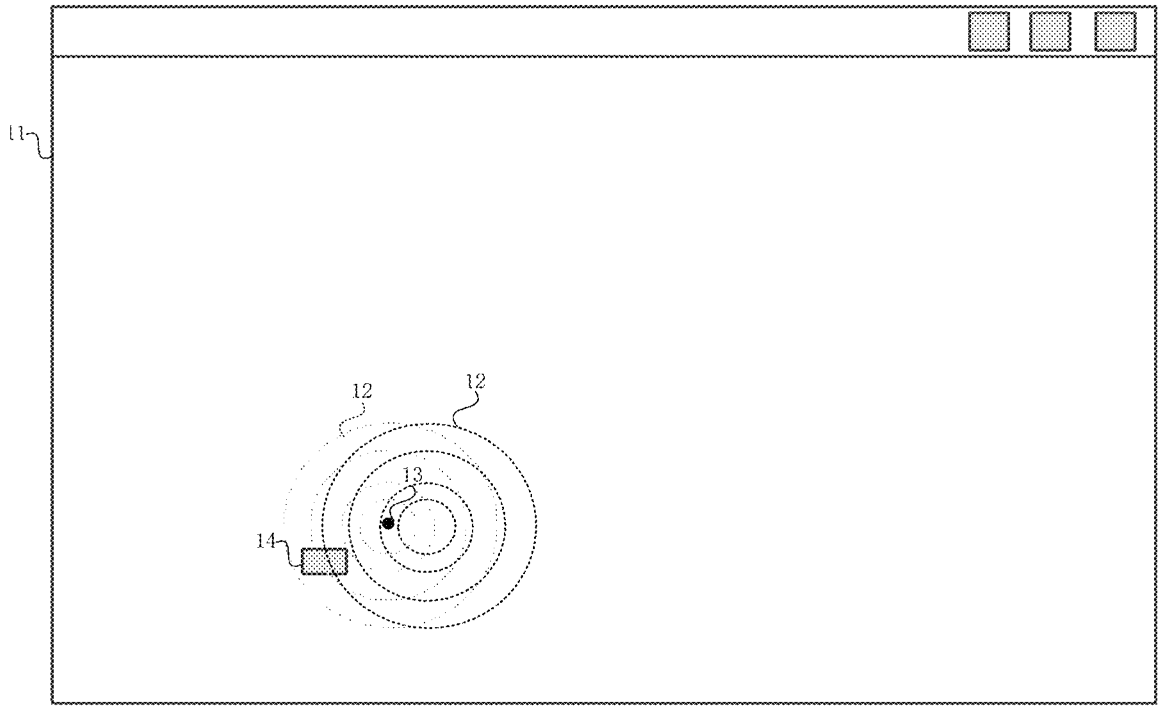
FIG. 1*c* and FIG. 1*d* respectively show effect display diagrams of performing movement of the region of interest during execution of the method for interaction in a virtual reality scene provided by the present embodiment.
Figure 1D:
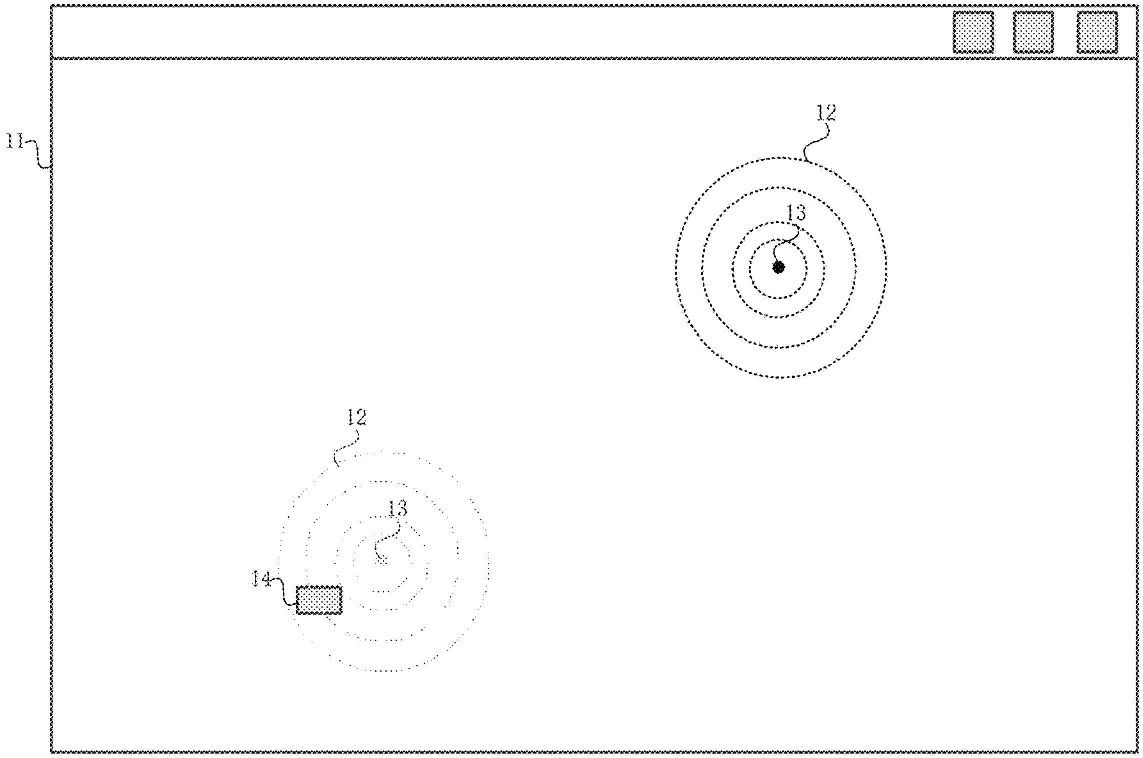

FIGS. 1*c* and 1*d* respectively show effect presentation diagrams of moving the region of interest during the execution of the method for interaction in the virtual reality scene provided in this embodiment. As shown in FIG. 1*c*, the region of interest 12 moves from an original position (a circular area with the lighter color) to a current position (a circular area with the heavier color), it can be seen that the movement distance of the region of interest 12 in FIG. 1*c* is relatively short, and the relative movement attribute value is also relatively small. Based on the description of the above steps, it can be considered that the movement attribute value at this time is less than the set threshold, therefore, the control point 13 in FIG. 1*c* is still located in the original display position, without moving along with the movement of the region of interest 12.

As shown in FIG. 1*d*, the region of interest 12 moves from the original position (a circular area with the lighter color) to a current position (a circular area with the heavier color), it can be seen that in FIG. 1*d*, the moving distance of the region of interest 12 is relatively long, and the corresponding movement attribute value is also large, based on the description of the above steps, it can be considered that the movement attribute value at this time is greater than the set threshold, therefore, after the region of interest 12 moves to the current position, the display position of the control point 13 in FIG. 1*d* is also reset from the original display position to the center point of the region of interest 12.

The above-mentioned first alternative embodiment is equivalent to expanding the functions of the interaction method in the virtual reality scene based on the above-mentioned embodiment, which further illustrates the association between the region of interest and the head control data, when the player's desired object to be interacted with in the virtual reality scene is adjusted, the head control data can be changed through eye movement and/or head movement operations, so as to roughly locate the new object to be interacted with via movement of the region of interest. It further illustrates the effectiveness of the combined interaction manner in practical applications and better improves the player experience.

On the basis of the first alternative embodiment, the interaction method in the virtual reality scene as mentioned above may be further optimized, when the movement attribute value is greater than or equal to the set threshold, the method may further include:

cancelling the displacement mapping between the hand operation region and the region of interest before movement, and re-establishing a displacement mapping relationship between the hand operation region with the region of interest after movement.

The key to realizing interactive control through combined input of head, eyes and hands in the method provided in this embodiment is to establish a displacement mapping between the hand operation region corresponding to the hand motion and the region of interest associated with the eyes and head, so that the control point can be moved finely within the region of interest through the hand motion. It can be known that when the position of the region of interest in the virtual reality scene changes, the mapping relationship between the hand operation region and the original region of interest will not be able to support the subsequent movement operation of the control point, in order to ensure normal movement of the control point in the region of interest subsequently, the step in the first alternative embodiment can be used to cancel the displacement mapping between the hand operation region and the original region of interest before movement, and re-establish a displacement mapping relationship between the hand operation region and the region of interest after movement.

It should be noted that the present embodiment can updatedly establish a displacement mapping relationship between the hand operation region and the region of interest in real time during the movement of the region of interest based on this step, however, considering the occupation of computing resources and non-necessity, the present embodiment may preferably only establish a displacement mapping relationship between the region of interest that is stably presented after the movement and the hand operation region.

It should also be noted that the hand operation region is constructed by taking the handle position of the virtual handle presented by a handle held by the player in the virtual reality scene as key information, therefore, when a position change of the virtual handle meets a set condition, the region position of the hand operation region may also change, when the regional position of the hand operation region changes, it is also necessary to reconstruct the displacement mapping relationship between the hand operation region with the region of interest.

In the present embodiment, the establishment of the displacement mapping relationship between the hand operation region and the region of interest can be achieved by aligning coordinate points in the hand operation region with coordinate points in the region of interest in the same coordinate system and assigning a given movement sensitivity coefficient.

Exemplarily, the effect of shown by the established displacement mapping relationship can be described as: the control handle moves in the hand operation region along a first movement trajectory, and the hand operation region coordinate points on the first movement trajectory can be acquired; based on the displacement mapping relationship, the region-of-interest coordinate points on the region of interest that are aligned with the hand operation region coordinate points on the first movement trajectory can be determined, and a second movement trajectory formed based on the determined region-of-interest coordinate points can be considered to be the trajectory presented after the control handle makes a response in the region of interest.

The above technical implementation of the first alternative embodiment of the present disclosure also illustrates the effectiveness of the combined interaction manner in practical applications, and better improves the player experience.

In order to better illustrate the effective improvement of the method provided by this embodiment in terms of interaction fatigue and interaction accuracy, this embodiment illustrates the effect through the following examples. This example takes an information browsing scene containing multiple window interfaces as an example, when an interaction object that the player wants to interact with changes from one window interface to another window interface, if the player wants to interact with a new object to be interacted with on the other window interface, in a case of using an existing handle ray to interact, the handle needs to be moved greatly to ensure that the moved ray can point to the new object to be interacted with on the other window interface.

Figure 1E:
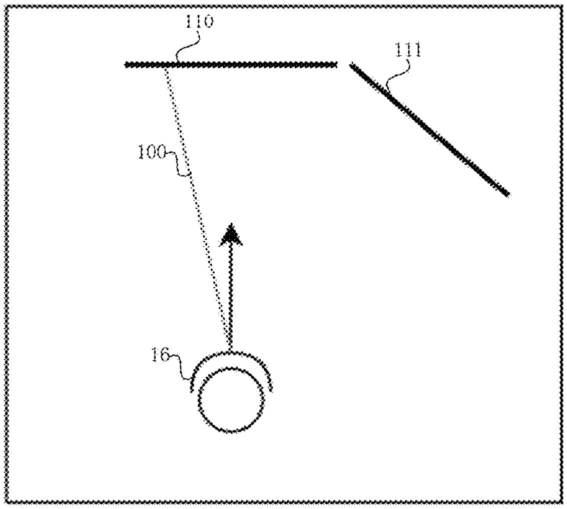
FIG. 1*e* and FIG. 1*f* respectively show effect display diagrams of performing selection of an interaction object in a multiple window interface scenario in the current ray-based interaction method.
Figure 1F:
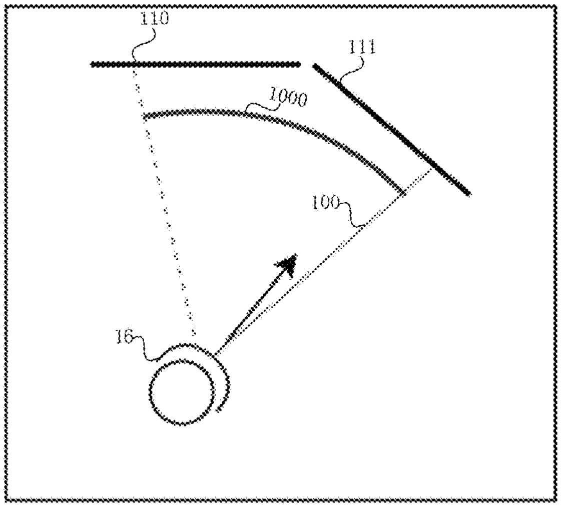

FIG. 1*e* and FIG. 1*f* show effect display diagrams of performing selection of an interaction object in a multiple window interface scenario in the current ray-based interaction method. As shown in FIG. 1*e* and FIG. 1*f*, a top view of a virtual reality scene is specifically given, wherein the first window interface 110 and the second window interface 111 are respectively presented as two line segments, and a virtual handle 16 is displayed in a top view. FIG. 1*e* shows an initial presentation state before the cross-window interface interaction, where the virtual handle 16 points to any object to be interacted with in the first window interface 110, and a ray 100 can be presented visually. FIG. 1*f* shows a presentation of the process of cross-window interface interaction, during the interaction process, the player controls the virtual handle 16 to move in a large angle range 1000, so that the ray 100 points from the first window interface 110 to a certain object to be interacted with on the second window interface in the visual effect.

It can be seen that in the existing interaction implementation, interactive input only relies on the virtual handle, and the switching of multi-window interfaces requires movement in a large angle range, which cannot provide a good player experience.

Continuing with the above description, when the interaction method provided in the present embodiment is employed to perform switching between multiple window interfaces, the player only needs to move his head or eyes to switch the region of interest from one window interface to another window interface for presentation, and then only needs to rotate the handle within a small angle range within the presented region of interest, so that the new object to be interacted with can be located through the control point.

Figure 1G:
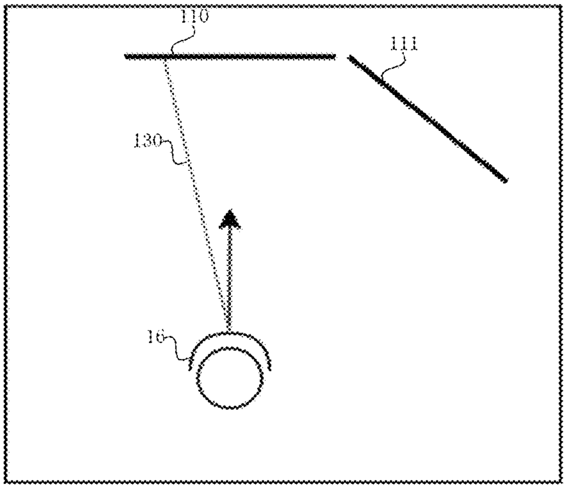
FIG. 1*g* and FIG. 1*h* respectively show effect display diagrams of performing selection of an interaction object in a multiple window interface scenario based on the method provided by the present embodiment.
Figure 1H:
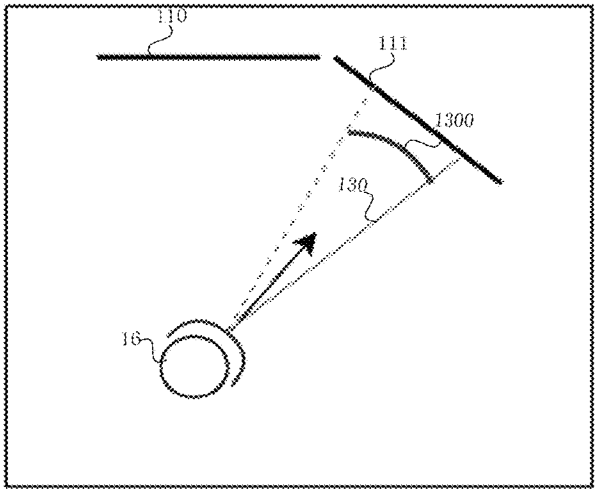

FIG. 1*g* and FIG. 1*h* show effect display diagrams of performing selection of an interaction object in a multiple window interface scenario based on the method provided by the present embodiment. As shown in FIG. 1*g* and FIG. 1*h*, a top view of the virtual reality scene is also given, wherein the first window interface 110 and the second window interface 111 are respectively presented as two line segments, and the virtual handle 16 is also displayed in the top view. FIG. 1*g* shows an initial presentation state before the cross-window interface interaction, where a control point corresponding to the virtual handle 16 is presented in the region of interest in the first window interface 110, wherein a second ray 130 is used in the figure to represent the visual effect of the control point and the virtual handle 16. FIG. 1*h* shows a presentation of the process of cross-window interface interaction by the method of the present embodiment, during the interaction, the player only needs to twist his head so that his/her face can be oriented to the second window interface 111, or the player turns his eyes so that the direction of eye line-of-sight is on the second window interface 111. And a region of interest for roughly locating a new object to be interacted with can be presented through the facial orientation or line-of-sight direction on the second window interface 111. In FIG. 1*f*, a dash-line ray can be used to represent a top view visual effect of the virtual handle 16 and the control point in the region of interest, after that, the virtual handle 16 can be rotated within a small angle range 1300, so that the control point can point to the new object to be interacted with in the region of interest. At this time, the top-view visual effect of the control point and the virtual handle can be reflected by the second ray 130.

It can be seen that in the interaction method provided in the present embodiment, the response to the interaction operations can be achieved based on a combination of head movement, eye movement and hand motion, which can better solve the problems of interaction fatigue and low interaction accuracy, and effectively improve the player experience.

As a second alternative embodiment of the embodiment of the present disclosure, based on the above embodiment, the interaction method in the above virtual reality scene can be further optimized, which can specifically include the following steps:

a2) receiving a movement sensitivity adjustment operation, updating the displacement mapping relationship between the region of interest and the hand operation region.

In the present embodiment, a displacement of one movement of the handle in the hand operation region and a length value of a corresponding displacement of the control point in the region of interest can be adjusted according to different movement sensitivities. In this embodiment, the movement sensitivity adjustment can be started by generating a movement sensitivity adjustment operation through a certain button or gesture.

In this step, upon receipt of the movement sensitivity adjustment operation, the displacement mapping relationship between the region of interest and the hand operation region can be updated to adjust the movement sensitivity. It can be known that if the received movement sensitivity adjustment operation is intended to reduce the movement sensitivity, a displacement length value mapped from the control point in the region of interest when the handle moves once can be reduced by adjusting the displacement mapping relationship between the region of interest and the hand operation region. In the effect presentation, this situation is equivalent to a case that when the player moves the handle once, the control point only moves with a short displacement in the region of interest.

Similarly, if the received movement sensitivity adjustment operation is intended to increase the movement sensitivity, a displacement length value mapped from the control point in the region of interest when the handle moves once can be increased by adjusting the displacement mapping relationship between the region of interest and the hand operation region. In the effect presentation, this situation is equivalent to a case that when the player moves the handle once, the control point can respond sensitively and move with a longer displacement in the region of interest.

b2) upon receipt of new hand posture data, determining a mapping position of the hand posture data in the region of interest according to the updated displacement mapping relationship, as a new target display position.

Continuing with the above description, after the movement sensitivity is adjusted based on the updated displacement mapping relationship, when this step receives new hand posture data again, the corresponding mapping position of the hand posture data in the region of interest will be adjusted based on the updated displacement mapping relationship, this step can use the mapping position determined after adjustment as the new target display position of the control point.

It can be known that if the sensitivity is turned down, the distance value between the unadjusted corresponding mapping position and the original display position will become smaller relative to the distance value between the mapping position determined after adjustment and the original display position; if the sensitivity is adjusted higher, the distance value between the unadjusted corresponding mapping position and the original display position will become larger relative to the distance value between the mapping position determined after adjustment and the original display position.

c2) moving the control point to the new target display position.

In response to the received hand posture data, this step may move the control point to a new target display position for display.

The second alternative embodiment of the present disclosure further increases the functional implementation of the interaction method, on the basis of the above method implementation, it is specifically added the influence of the movement sensitivity adjustment operation on the movement of the control point in the region of interest. This technical implementation also demonstrates the effectiveness of combined interaction in practical applications and better improves the fine displacement control.

As a third alternative embodiment of the embodiment of the present disclosure, based on the above embodiments, the interaction method in the above virtual reality scene can be further optimized, specifically, the third alternative embodiment of the present disclosure can optimize the implementation of establishing the displacement mapping relationship between the region of interest and the hand operation region into the following steps:

a3) delineating a hand operation region according to the hand position data in the hand posture data, and acquiring a preset current movement sensitivity coefficient.

In this embodiment, the hand position data can be considered as the current position data of the virtual handle, and an expansion can be performed with the coordinate point corresponding to the hand position data as the center to form the hand operation region, this embodiment can also use the coordinate point corresponding to the hand position data as the operation coordinate origin when constructing a coordinate system with the hand operation region. This step can also acquire a current movement sensitivity coefficient that matches the currently set movement sensitivity.

b3) aligning coordinate points in the hand operation region with coordinate points in the region of interest through selected alignment reference points.

In the present embodiment, the coordinate points in the coordinate system where the hand operation region is located and the coordinate points in the coordinate system where the attention area is located may be aligned through selected alignment reference points with one of the coordinate systems as a reference. Exemplarily, the alignment reference points can include the coordinate point of the upper left corner vertex in the hand operation region and that in the region of interest, or the coordinate point of the center point position in the hand operation region and that in the region of interest, or the coordinate origins of the coordinate systems where the hand operation region and the region of interest are located.

c3) establishing a displacement mapping relationship between the coordinate points in the hand operation region and the coordinate points in the region of interest, based on the current movement sensitivity coefficient.

In this embodiment, illustratively, the operation coordinate origin in the coordinate system where the hand operation region is located and the region coordinate origin in the coordinate system where the region of interest is located may be aligned with one of the coordinate systems as a reference. This step can establish a displacement mapping relationship between the coordinate points in the hand operation region and the coordinate points in the region of interest based on the current movement sensitivity coefficient acquired above, and the formed displacement mapping relationship of the coordinate points constitutes the displacement mapping relationship between the region of interest and the hand operation region.

The above technical solution of this embodiment provides one specific implementation manner of the position mapping relationship between the region of interest and the hand operation region, which is equivalent to providing underlying technical support for the interaction implementation of this embodiment.

As a fourth alternative embodiment of the embodiment of the present disclosure, on the basis of the above embodiment, further optimization can be performed before responding to an interactive operation generated when the control point acts on the object to be interacted with, and may include: analyzing a triggering behavior of the control point on a trigger component, and generating an interactive operation acting on the object to be interacted; wherein the trigger component is the object to be interacted, and/or, is a trigger region formed after the region expansion is performed on the object to be interacted.

In this embodiment, the interaction operation that can be responded to by the object to be interacted with can be generated by analyzing the triggering behavior generated by the control point relative to the trigger component. Among them, the triggering behavior may include clicking, dragging, and rotating, etc. Generally, the object to be interacted with can be directly regarded as a trigger component, and the triggering behavior can directly act on the object to be interacted with. However, considering a false triggering behavior caused when the control point acts on the edge of the object to be interacted, this embodiment optimizes the trigger component, and the triggering region formed by the region expansion based on the object to be interacted can also be regarded as the trigger component.

It can be understood that the present embodiment is equivalent to providing a triggering behavior for generating an interactive operation when the control point acts on the object to be interacted with itself, or acts on a trigger region corresponding to the object to be interacted with. As an example of avoiding false triggering in the present embodiment, the object to be interacted with may be preferably each character button in a virtual keyboard presented in a virtual reality scene for text inputting.

Based on the fourth alternative embodiment described above, the step of determining the trigger region may be optimized as follows:

a4) when it is detected that the control point is located in an edge region of the object to be interacted with, performing an equidistant region expansion with an edge frame of the object to be interacted with as a starting position.

In this embodiment, the control point can move to the object to be interacted with for display based on the hand posture data. If it is detected in this step that the display position of the control point is located in the edge area of the object to be interacted with, it can be considered that the operation of constructing a trigger region for the object to be interacted with is triggered, wherein the edge area can be considered as the edge frame of the object to be interacted with.

In this step, when a condition for constructing the trigger region is met, the region expansion can be performed outward with the object to be interacted with as the center, specifically, the equidistant region expansion can be performed around with an edge frame of the object to be interacted with as a starting position.

b4) determining a region formed by the expansion as the trigger region, wherein the equidistant distance value is smaller than an adjacent distance between the object to be interacted with and an adjacent object.

In this step, the expanded region formed around the object to be interacted with may be determined as the expansion region for the object to be interacted with, and when the region expansion is performed as above, the equidistant distance value that can be expanded outward needs to be smaller than the adjacent distance between the object to be interacted with and other interaction objects adjacent thereto. Exemplarily, a character button in the presented virtual keyboard is taken as the object to be interacted with, and other character buttons adjacent to the character button in the virtual keyboard can be regarded as adjacent objects of the object to be interacted with, and the adjacent distance can be regarded as the shortest distance value between the character button and other adjacent character buttons.

The above technical solution of the fourth alternative embodiment of the present disclosure can also be regarded as a functional extension for the interaction method provided in the embodiment, on the basis of ensuring flexible interaction, it further adds a function to avoid false triggering. This functional implementation can better improve the interaction fineness.

Figure 1I:
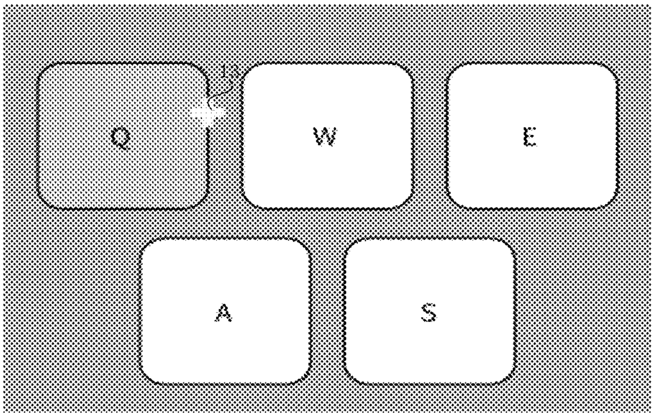
FIG. 1*i* to FIG. 1*k* respectively show effect display diagrams of avoiding false triggering of interactive operations in the interaction method provided by the present embodiment.
Figure 1J:
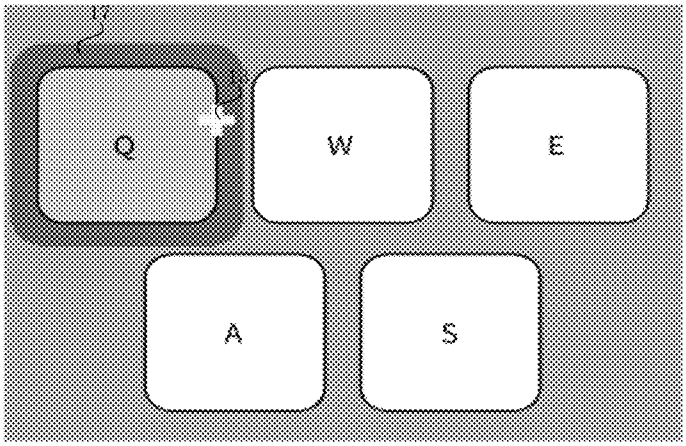
Figure 1K:
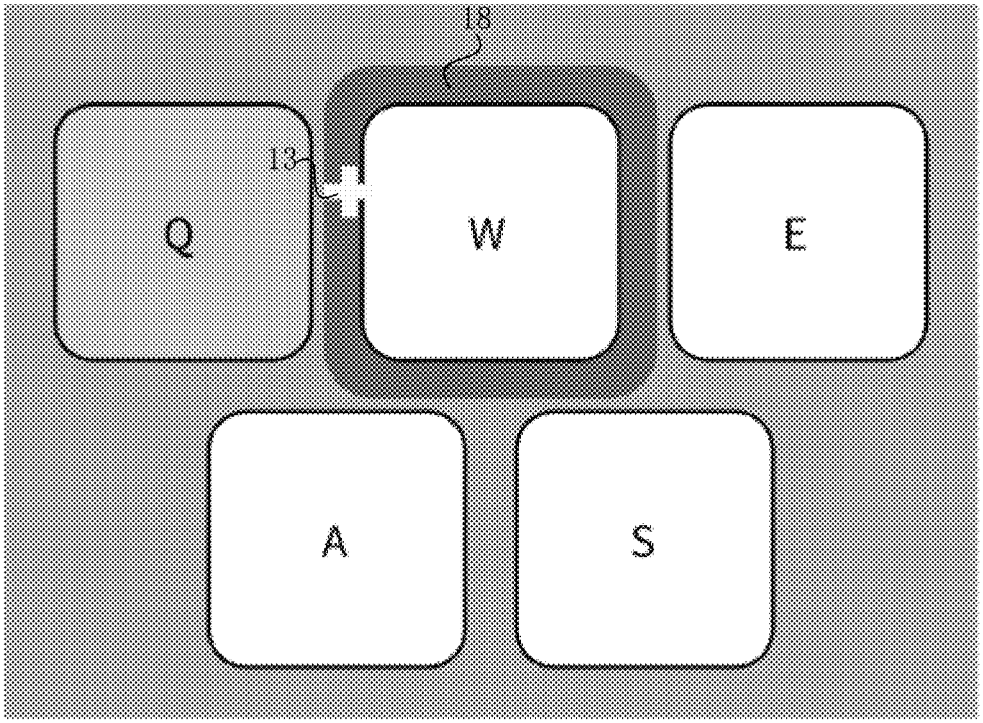

In order to better understand the implementation of the false triggering function provided by the present embodiment, the embodiment will be described with an example. FIG. 1*i* to FIG. 1*k* shows effect display diagrams of avoiding false triggering of interactive operations in the interaction method provided by the present embodiment. As shown in FIG. 1*i* to FIG. 1*k*, this embodiment takes the character buttons in the virtual keyboard as an example to illustrate the effect. Specifically, as shown in FIG. 1*i*, the control point 13 is on the edge frame of the character button 'Q' in the presented virtual keyboard, at this time, considering the false triggering mechanism, the control point cannot apply a required triggering behavior to the character button 'Q'. As shown in FIG. 1*j*, when it is detected that the control point is presented in the state of FIG. 1*i*, a region expansion can be performed on the character button 'Q' to form a trigger region 17 for the character button 'Q'; it can be seen that the expansion distance of the formed trigger region 17 is smaller than the minimum adjacent distance from the character button 'Q' to the character button 'W' and the character button 'A'. As an extended explanation of the above-mentioned false triggering mechanism, it can be considered that when the control point 13 leaves the character button 'Q' (the object to be interacted with) or its corresponding trigger region, the formed trigger region 17 will disappear accordingly. As shown in FIG. 1*k*, when the control point 13 falls on the edge frame of the character button 'W' again, a new trigger region 18 will be formed relative to the character button 'W' based on the above operation, and it can be seen that the trigger region for the character button 'Q' no longer exists at this time.

As a fifth alternative embodiment of the embodiment of the present disclosure, based on the above embodiment, the above interaction method in the virtual reality scene can be further optimized. Specifically, it can include the following steps:

a5) receiving out-of-region posture data generated outside the hand operation region.

It should be noted that this embodiment is not limited to the case that the control point is presented only when hand posture data is generated within the hand operation region, on the basis of the fifth alternative embodiment of the present disclosure, this step can also receive hand posture data formed when the player manipulates the handle outside the hand operation region, which is recorded as out-of-area posture data in this embodiment.

b5) moving the control point to an out-of-region display position, where the out-of-region display position is located outside the region of interest and is a scene mapping position of the out-of-region posture data relative to the virtual reality scene.

Through this step, the control point corresponding to the out-of-region posture data in the virtual reality scene can also be displayed, specifically, the control point can move to be displayed at the out-of-region display position corresponding to the out-of-region posture data.

Among them, it can be considered that the out-of-region display position is also outside the region of interest, and the out-of-region display position can be considered as the scene mapping position of the out-of-region posture data relative to the virtual reality scene. That is, it can be considered that in addition to establishing a displacement mapping relationship between the hand operation region and the region of interest, the virtual handle can also establish a displacement mapping relationship between the active area outside the hand operation region and the entire virtual reality scene, when the virtual handle is active in a planar area outside the hand operation region, its corresponding hand posture data will establish a displacement mapping relationship with the virtual reality scene, and correspond to a mapping position in the virtual reality scene, which is recorded as a scene mapping position in this embodiment.

The fifth alternative embodiment of the present disclosure can also be regarded as a functional extension of the interaction method provided by the embodiment of the present disclosure, it replaces the angle mapping between the existing handle and the virtual reality scene and establishes a new position mapping, thereby allowing any interaction object in the virtual reality scene to be pointed to in the form of a control point, thereby ensuring the flexibility of interaction.

On the basis of the fifth alternative embodiment described above, further optimization may be made to include: responding to an interactive operation generated when the control point acts on other objects to be interacted with outside the region of interest.

It can be known that in addition to the region of interest, there are also interaction objects in the virtual reality scene, through the above-mentioned control point movement implementation manner, the present embodiment can also realize a function of performing a triggering behavior on an object to be interacted in other areas outside the region of interest through the control point. The additional steps of this alternative embodiment can respond to the interactive operations generated when acting on other objects to be interacted.

The newly added functions implemented in the present embodiment can be regarded as a functional improvement of the above-mentioned interaction method, the entire technical solution, through the manner of multi-input coordinated movement, can determine the range of interest of the head and eyes, and perform fine control with the hands, such combined interaction method can effectively solve the problems of interaction fatigue and low interaction accuracy in the existing interactions, the player's immersive experience can be better improved.

Figure 2:
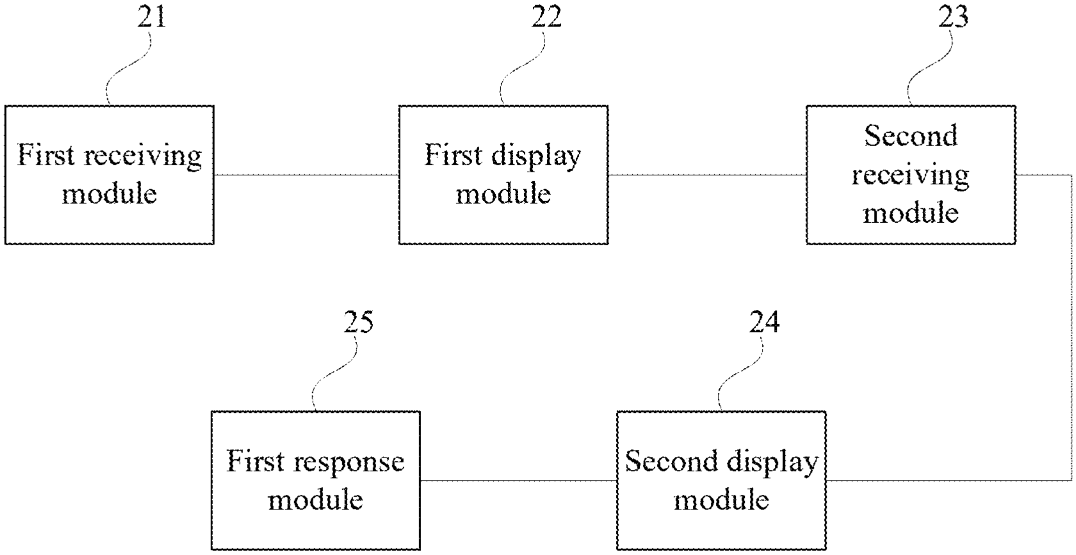
FIG. 2 is a schematic structural diagram of an apparatus for interaction in a virtual reality scene provided by an embodiment of the present disclosure.

FIG. 2 is a schematic structural diagram of an apparatus for interaction in a virtual reality scene provided by an embodiment of the present disclosure. As shown in FIG. 2, the apparatus may include: a first receiving module 21, a first display module 22, a second receiving module, a second display module 23 and a first response module 24, wherein:

the first receiving module 21 is configured to receive head control data for acting in the virtual reality scene;

the first display module 22 is configured to determine a region of interest based on the head control data, and display the region of interest and a control point in the virtual reality scene, wherein the control point is initially located at a set position of the region of interest, and the region of interest includes an object to be interacted with;

the second receiving module 23 is configured to receive hand posture data generated in a hand operation region, wherein there is a displacement mapping relationship between the hand operation region and the region of interest;

the second display module 24 is configured to move the control point to a target display position, wherein the target display position is a mapping position of the hand posture data in the region of interest;

the first response module 25 is configured to respond to an interactive operation generated when the control point acts on the object to be interacted with.

When there is a need to interact with the virtual reality scene, the apparatus for interaction in a virtual reality scene provided by an embodiment of the present disclosure can roughly determine a region of interest in the virtual reality scene based on the player's head control data (such as head posture data or line-of-sight data), and then perform fine selection based on a control point mapped from the hand posture data in the region of interest. Different from the existing interaction solutions, the present technical solution combines head control data with hand posture data to achieve interaction in a virtual reality scene in a combined form, which can effectively solve the problem of interaction fatigue of body parts caused by a single interaction; meanwhile, the technical solution can first narrow an interaction range to locate the region of interest and then accurately select an interaction objects such as a button or a control, etc. in the region of interest through a control point, which can reduce the risk of difficult in accurately selecting interaction objects, and improve the interaction accuracy, thereby enhancing the player's immersive experience in the virtual reality scene.

Furthermore, the apparatus may also include:

a movement control module, configured to control the region of interest to move in the virtual reality scene as the received head control data changes;

a first execution module, configured to, in response to a movement attribute value of the region of interest after movement being less than a set threshold, keep a display position of the control point unchanged;

a second execution module, configured to, in response to the movement attribute value being greater than or equal to the set threshold, reset the control point to a center point of the region of interest after movement.

Furthermore, the second execution module may be further configured to: cancel the displacement mapping between the hand operation region and the region of interest before movement, and re-establish a displacement mapping relationship between the hand operation region with the region of interest after movement.

Furthermore, the apparatus may further include:

a mapping updating module, configured to, upon receipt of a movement sensitivity adjustment operation, update the displacement mapping relationship between the region of interest and the hand operation region;

an information determination module, configured to, upon receipt of new hand posture data, determine a mapping position of the hand posture data in the region of interest according to the updated displacement mapping relationship as a new target display position;

a display updating module, configured to move the control point to the new target display position.

Furthermore, the apparatus may further include a mapping establishment module, configured to:

delineate a hand operation region according to the hand position data in the hand posture data, and acquire a preset current movement sensitivity coefficient;

align coordinate points in the hand operation region with coordinate points in the region of interest through selected alignment reference points;

establish a displacement mapping relationship between the coordinate points in the hand operation region and the coordinate points in the region of interest is established, based on the current movement sensitivity coefficient.

Furthermore, the apparatus may further include a triggering analysis module, configured to:

before an interactive operation generated when the control point acts on the object to be interacted with is responded to, analyze a triggering behavior of the control point on a trigger component, and generate an interactive operation acting on the object to be interacted with; wherein the trigger component is at least one of the object to be interacted with and a trigger region formed by region expansion of the object to be interacted with.

Furthermore, the apparatus may further include a trigger region generation module, configured to:

before a triggering behavior of the control point on a trigger component is analyzed, when it is detected that the control point is located in an edge region of the object to be interacted with, perform an equidistant region expansion with an edge frame of the object to be interacted with as a starting position; determine a region formed by the expansion as the trigger region, wherein the equidistant distance value is smaller than an adjacent distance between the object to be interacted with and an adjacent object.

Furthermore, the apparatus may further include:

a third receiving module, configured to receive out-of-region posture data generated outside the hand operation region;

a third display module, configured to move the control point to an out-of-region display position, where the out-of-region display position is located outside the region of interest and is a scene mapping position of the out-of-region posture data relative to the virtual reality scene.

Furthermore, the apparatus may further include:

a second response module, configured to respond to an interactive operation generated when the control point acts on other objects to be interacted with outside the region of interest.

The apparatus for interaction in the virtual reality scene provided by the embodiments of the present disclosure can execute the method for interaction in the virtual reality scene provided by any embodiment of the present disclosure, and has functional modules and beneficial effects corresponding to the execution method.

It shall note that the various units and/or modules included in the above-mentioned apparatus are only divided according to functional logic, but are not limited to the above-mentioned division, as long as the corresponding functions can be achieved; in addition, specific names of the units are only for the convenience of distinguishing from each other, instead of being used to limit the protection scopes of the embodiments of the present disclosure.

Figure 3:
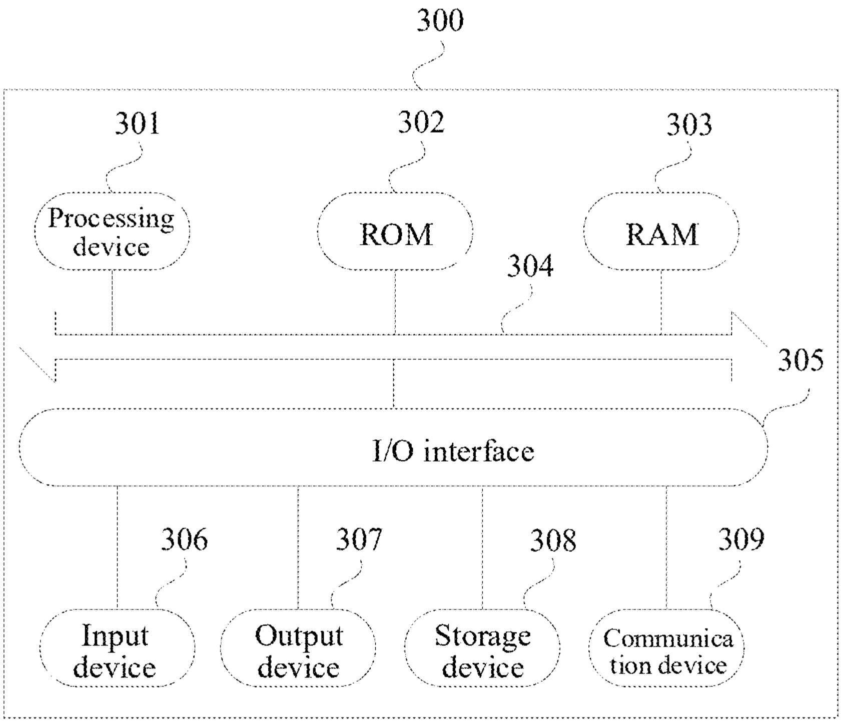
FIG. 3 is a schematic structural diagram of an electronic device provided by an embodiment of the present disclosure.

FIG. 3 illustrates a structural schematic diagram of an electronic device provided by an embodiment of the present disclosure. Hereinafter reference will be made with reference to FIG. 3, which illustrates a structural schematic diagram of an electronic device (such as a terminal device or a server in FIG. 3) 300 suitable for implementing the embodiments of the present disclosure. The electronic devices in the embodiments of the present disclosure may include, but are not limited to, mobile terminals such as mobile phones, notebook computers, digital broadcast receivers, PDA (Personal Digital Assistant), PAD (Tablet Computer), PMP (Portable Multimedia Player), vehicle-mounted terminals (such as vehicle-mounted navigation terminals), and fixed terminals such as digital TV and desktop computers. The electronic device shown in FIG. 3 is only an example, and should not bring any limitation to the functions and application scopes of the embodiments of the present disclosure.

As shown in FIG. 3, an electronic device 300 may include a processing device (such as a central processing unit, a graphics processor, etc.) 301, which may perform various appropriate actions and processes according to a program stored in a read-only memory (ROM) 302 or a program loaded from a storage device 308 into a random-access memory (RAM) 303. In the RAM 303, various programs and data required for the operation of electronic device 300 are also stored. A processing device 301, a ROM 302 and a RAM 303 are connected to each other through a bus 304. An input/output (I/O) interface 305 is also connected to the bus 304.

Generally, the following devices can be connected to the I/O interface 305: an input device 306 including, for example, a touch screen, a touch pad, a keyboard, a mouse, a camera, a microphone, an accelerometer, a gyroscope, etc.; an output device 307 including, for example, a liquid crystal display (LCD), a speaker, a vibrator, etc.; a storage device 308 including, for example, a magnetic tape, a hard disk, etc.; and a communication device 309. The communication device 309 may allow the electronic device 300 to communicate wirelessly or wired with other devices to exchange data. Although FIG. 3 shows an electronic device 300 with various devices, it should be understood that it is not required to implement or have all the devices as shown. More or fewer devices may alternatively be implemented or provided.

In particular, according to embodiments of the present disclosure, the processes described above with reference to the flowcharts can be implemented as a computer software program. For example, an embodiment of the present disclosure includes a computer program product including a computer program carried on a non-transitory computer-readable medium, which contains program codes for executing the methods shown in the flowcharts. In such an embodiment, the computer program can be downloaded and installed from the network through the communication device 309, or installed from the storage device 308, or installed from the ROM 302. When the computer program is executed by the processing device 301, the above functions defined in the methods of the embodiments of the present disclosure can be implemented.

The names of the messages or information exchanged between multiple devices in the embodiments of the present disclosure are only used for illustrative purposes and are not used to limit the scope of these messages or information.

The electronic device provided by the embodiment of the present disclosure and the interface interaction method provided by the above embodiment belong to the same inventive concept, the technical details not fully described in this embodiment can be referred to the above embodiment, and this embodiment has the same beneficial effects as the above embodiment.

An embodiment of the present disclosure provides a computer storage medium on which a computer program is stored, when the program is executed by a processor, the interface interaction method provided by the above embodiment can be implemented.

It should be noted that the computer-readable medium mentioned above in the present disclosure can be a computer-readable signal medium or a computer-readable storage medium or any combination of such two. The computer-readable storage medium can be, for example, but not limited to, an electrical, magnetic, optical, electromagnetic, infrared, or semiconductor system, apparatus or device, or a combination of the above. More specific examples of computer-readable storage media may include, but not limited to, an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above. In the present disclosure, a computer-readable storage medium can be any tangible medium containing or storing a program, which can be used by or in combination with an instruction execution system, apparatus or device. In the present disclosure, a computer-readable signal medium may include a data signal propagated in baseband or as part of a carrier wave, in which computer-readable program codes are carried. This propagated data signal can take many forms, including but not limited to electromagnetic signals, optical signals or any suitable combination of the above. A computer-readable signal medium can also be any computer-readable medium other than a computer-readable storage medium, and can send, propagate or transmit a program for use by or in connection with an instruction execution system, apparatus or device. The program codes contained in the computer-readable medium can be transmitted by any suitable medium, including but not limited to wires, optical cables, RF (radio frequency) and the like, or any suitable combination of the above.

In some embodiments, the electronic devices can communicate with each other by using any currently known or future to-be-developed network protocol such as HTTP (HyperText Transfer Protocol), and can be interconnected with digital data communication in any form or medium (for example, communication network). Examples of communication networks include a local area network ("LAN"), a wide area network ("WAN"), an internet network (for example, Internet) and end-to-end networks (for example, ad hoc end-to-end networks), as well as any currently known or future to-be-developed networks.

The computer-readable medium may be included in the above electronic device; or it can exist alone without being assembled into the electronic device.

The computer-readable medium carries one or more programs, and when the one or more programs are executed by the electronic device, the electronic device is caused to: receive head control data for acting in the virtual reality scene; determine a region of interest based on the head control data, and displaying the region of interest and a control point in the virtual reality scene, wherein the control point is initially located at a set position of the region of interest, and the region of interest includes an object to be interacted with; receive hand posture data generated in a hand operation region, wherein there is a displacement mapping relationship between the hand operation region and the region of interest; move the control point to a target display position, wherein the target display position is a mapping position of the hand posture data in the region of interest; respond to an interactive operation generated when the control point acts on the object to be interacted with.

Computer program codes for performing the operations of the present disclosure may be written in one or more programming languages or their combinations, including but not limited to object-oriented programming languages, such as Java, Smalltalk, C++, and conventional procedural programming languages, such as "C" language or similar programming languages. The program codes can be completely executed on the user's computer, partially executed on the user's computer, executed as an independent software package, partially executed on the user's computer and partially executed on a remote computer, or completely executed on a remote computer or server. In the case involving a remote computer, the remote computer may be connected to a user computer through any kind of network, including a local area network (LAN) or a wide area network (WAN), or may be connected to an external computer (for example, through the Internet using an Internet service provider).

The flowcharts and block diagrams in the drawings illustrate the architectures, functions and operations of possible implementations of systems, methods and computer program products according to various embodiments of the present disclosure. In this regard, each block in the flowchart or block diagram may represent a module, a program clip, or a part of code that contains one or more executable instructions for implementing specified logical functions. It should also be noted that in some alternative implementations, the functions noted in the blocks may occur in a different order than those noted in the drawings. For example, two blocks shown in succession may actually be executed substantially in parallel, and they may sometimes be executed in the reverse order, depending on the functions involved. It should also be noted that each block in the block diagrams and/or flowcharts, and combinations of blocks in the block diagrams and/or flowcharts, can be implemented by a dedicated hardware-based system that performs specified functions or operations, or by a combination of dedicated hardware and computer instructions.

The modules involved in the embodiments described in the present disclosure can be realized by software or hardware. Among them, the name of the module does not constitute the limitation of the module itself in some cases. For example, the first acquisition unit may also be described as a "unit for acquiring at least two Internet Protocol addresses".

The functions described above herein may be at least partially performed by one or more hardware logic components. For example, without limitation, exemplary types of hardware logic components that can be used may include: Field Programmable Gate Array (FPGA), Application Specific Integrated Circuit (ASIC), Application Specific Standard Product (ASSP), System on Chip (SOC), Complex Programmable Logic Device (CPLD) and so on.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. A machine-readable medium may include, but is not limited to, an electronic, magnetic, optical, electromagnetic, infrared, or semiconductor system, device or equipment, or any suitable combination of the above. More specific examples of the machine-readable storage medium may include an electrical connection based on one or more lines, a portable computer disk, a hard disk, a random-access memory (RAM), a read-only memory (ROM), an erasable programmable read-only memory (EPROM or flash memory), an optical fiber, a convenient compact disk read-only memory (CD-ROM), an optical storage device, a magnetic storage device, or any suitable combination of the above.

The present disclosure may be embodied in any form described herein, including but not limited to the illustrative examples listed below, which describe the structure, features, and functions of some portions of the present invention. Nevertheless, it will be understood that various modifications may be made without departing from the spirit and scope of the disclosure.

According to one or more embodiments of the present disclosure, [Example 1] provides an method for interaction in a virtual reality scene, including:

receiving head control data for acting in the virtual reality scene;

determining a region of interest based on the head control data, and displaying the region of interest and a control point in the virtual reality scene, wherein the control point is initially located at a set position of the region of interest, and the region of interest includes an object to be interacted with;

receiving hand posture data generated in a hand operation region, wherein there is a displacement mapping relationship between the hand operation region and the region of interest;

moving the control point to a target display position, wherein the target display position is a mapping position of the hand posture data in the region of interest;

responding to an interactive operation generated when the control point acts on the object to be interacted with.

According to one or more embodiments of the present disclosure, [Example 2] provides an method for interaction in a virtual reality scene, wherein the method may further include:

controlling the region of interest to move in the virtual reality scene as the received head control data changes;

in response to a movement attribute value of the region of interest after movement being less than a set threshold, keeping a display position of the control point unchanged;

in response to the movement attribute value being greater than or equal to the set threshold, resetting the control point to a center point of the region of interest after movement.

According to one or more embodiments of the present disclosure, [Example 3] provides an method for interaction in a virtual reality scene, wherein the method may further include: in response to the movement attribute value being greater than or equal to the set threshold, cancelling the displacement mapping between the hand operation region and the region of interest before movement, and re-establishing a displacement mapping relationship between the hand operation region with the region of interest after movement.

According to one or more embodiments of the present disclosure, [Example 4] provides an method for interaction in a virtual reality scene, wherein the method may further include:

upon receipt of a movement sensitivity adjustment operation, updating the displacement mapping relationship between the region of interest and the hand operation region;

upon receipt of new hand posture data, determining a mapping position of the hand posture data in the region of interest according to the updated displacement mapping relationship as a new target display position;

moving the control point to the new target display position.

According to one or more embodiments of the present disclosure, [Example 5] provides an method for interaction in a virtual reality scene, wherein in the method, preferably, the step of establishing a displacement mapping relationship between the region of interest and the hand operation region may include:

delineating a hand operation region according to the hand position data in the hand posture data, and acquiring a preset current movement sensitivity coefficient;

aligning coordinate points in the hand operation region with coordinate points in the region of interest through selected alignment reference points;

establishing a displacement mapping relationship between the coordinate points in the hand operation region and the coordinate points in the region of interest is established, based on the current movement sensitivity coefficient.

According to one or more embodiments of the present disclosure, [Example 6] provides an method for interaction in a virtual reality scene, wherein the method further includes: before responding to an interactive operation generated when the control point acts on the object to be interacted with, analyzing a triggering behavior of the control point on a trigger component, and generating an interactive operation acting on the object to be interacted with;

wherein the trigger component is the object to be interacted with, and/or, a trigger region formed by region expansion of the object to be interacted with.

According to one or more embodiments of the present disclosure, [Example 7] provides an method for interaction in a virtual reality scene, wherein in the method, preferably, the trigger region can be generated by:

when it is detected that the control point is located in an edge region of the object to be interacted with, performing an equidistant region expansion with an edge frame of the object to be interacted with as a starting position;

determining a region formed by the expansion as the trigger region, wherein the equidistant distance value is smaller than an adjacent distance between the object to be interacted with and an adjacent object.

According to one or more embodiments of the present disclosure, [Example 8] provides an method for interaction in a virtual reality scene, wherein the method may further include:

receiving out-of-region posture data generated outside the hand operation region;

moving the control point to an out-of-region display position, where the out-of-region display position is located outside the region of interest and is a scene mapping position of the out-of-region posture data relative to the virtual reality scene.

According to one or more embodiments of the present disclosure, [Example 9] provides an method for interaction in a virtual reality scene, wherein the method may further include:

responding to an interactive operation generated when the control point acts on other objects to be interacted with outside the region of interest.

According to one or more embodiments of the present disclosure, [Example 10] provides an apparatus for interaction in a virtual reality scene, including:

a first receiving module, configured to receive head control data for acting in the virtual reality scene;

a first display module, configured to determine a region of interest based on the head control data, and display the region of interest and a control point in the virtual reality scene, wherein the control point is initially located at a set position of the region of interest, and the region of interest includes an object to be interacted with;

a second receiving module, configured to receive hand posture data generated in a hand operation region, wherein there is a displacement mapping relationship between the hand operation region and the region of interest;

a second display module, configured to move the control point to a target display position, wherein the target display position is a mapping position of the hand posture data in the region of interest;

a first response module, configured to respond to an interactive operation generated when the control point acts on the object to be interacted with.

According to one or more embodiments of the present disclosure, [Example 11] provides an electronic device, including:

one or more processors;

a memory for storing one or more programs, wherein the one or more programs, when executed by the one or more processors, cause the one or more processors to perform the method according to any of [Example 1] to [Example 9] of the present disclosure.

According to one or more embodiments of the present disclosure, [Example 12] provides a computer readable storage medium which stores a computer program thereon, wherein the computer program, when executed by a computer processor, cause implementation of the method according to any of [Example 1] to [Example 9] of the present disclosure.

According to one or more embodiments of the present disclosure, [Example 13] provides a computer program product comprising instructions which, when executed by a processor, causes implementation of the interface interaction method according to any of [Example 1] to [Example 9] of the present disclosure.

According to one or more embodiments of the present disclosure, [Example 14] provides a computer program comprising program codes which, when executed by a processor, cause implementation of the interface interaction method according to any of [Example 1] to [Example 9] of the present disclosure.

The above description is only a preferred embodiment of the present disclosure and an illustration of the technical principles used. Those skilled in the art should understand that the scope of disclosure involved in the present disclosure is not limited to the technical solutions formed by a specific combination of the above-mentioned technical features, but should also cover other technical solutions formed by any combination of the above-mentioned technical features or their equivalent features without departing from the above-mentioned disclosure concepts. For example, the above-mentioned features are replaced with the technical features with similar functions disclosed in this disclosure (but not limited to) to form a technical solution.

Further, while operations are depicted in a particular order, this should not be understood as requiring that such operations be performed in the particular order shown or in a sequential order. Under certain circumstances, multitasking and parallel processing may be advantageous. Likewise, while the above discussion includes several specific implementation details, these should not be construed as limitations on the scope of the present disclosure. Certain features that are described in the context of separate embodiments can also be implemented in combination in a single embodiment. Conversely, various features that are described in the context of a single embodiment can also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims.

What is claimed is:

1. A method for interaction in a virtual reality scene, comprising:

receiving head control data for acting in the virtual reality scene;

determining a region of interest based on the head control data, and displaying the region of interest and a control point in the virtual reality scene, wherein the control point is initially located at a set position of the region of interest, and the region of interest includes an object to be interacted with;

receiving hand posture data generated in a hand operation region, wherein there is a displacement mapping relationship between the hand operation region and the region of interest;

moving the control point to a target display position, wherein the target display position is a mapping position of the hand posture data in the region of interest;

responding to an interactive operation generated when the control point acts on the object to be interacted with.

2. The method according to claim 1, further comprising:

controlling the region of interest to move in the virtual reality scene as the received head control data changes;

in response to a movement attribute value of the region of interest after movement being less than a set threshold, keeping a display position of the control point unchanged;

in response to the movement attribute value being greater than or equal to the set threshold, resetting the control point to a center point of the region of interest after movement.

3. The method according to claim 2, wherein, in response to the movement attribute value being greater than or equal to the set threshold, the method further comprises:

cancelling the displacement mapping between the hand operation region and the region of interest before movement, and re-establishing a displacement mapping relationship between the hand operation region with the region of interest after movement.

4. The method according to claim 1, further comprising:

upon receipt of a movement sensitivity adjustment operation, updating the displacement mapping relationship between the region of interest and the hand operation region;

upon receipt of new hand posture data, determining a mapping position of the hand posture data in the region of interest according to the updated displacement mapping relationship as a new target display position;

moving the control point to the new target display position.

5. The method according to claim 1, wherein a step of establishing a displacement mapping relationship between the region of interest and the hand operation region comprises:

delineating a hand operation region according to the hand position data in the hand posture data, and acquiring a preset current movement sensitivity coefficient;

aligning coordinate points in the hand operation region with coordinate points in the region of interest through selected alignment reference points;

establishing a displacement mapping relationship between the coordinate points in the hand operation region and the coordinate points in the region of interest, based on the current movement sensitivity coefficient.

6. The method according to claim 1, wherein before responding to an interactive operation generated when the control point acts on the object to be interacted with, the method further comprises:

analyzing a triggering behavior of the control point on a trigger component, and generating an interactive operation acting on the object to be interacted with;

wherein the trigger component is at least one of the object to be interacted with and a trigger region formed by region expansion of the object to be interacted with.

7. The method according to claim 6, wherein generation of the trigger region comprises:

when it is detected that the control point is located in an edge region of the object to be interacted with, performing an equidistant region expansion with an edge frame of the object to be interacted with as a starting position;

determining a region formed by the expansion as the trigger region, wherein the equidistant distance value is smaller than an adjacent distance between the object to be interacted with and an adjacent object.

8. The method according to claim 1, further comprising:

receiving out-of-region posture data generated outside the hand operation region;

moving the control point to an out-of-region display position, wherein the out-of-region display position is located outside the region of interest and is a scene mapping position of the out-of-region posture data relative to the virtual reality scene.

9. The method according to claim 1, further comprising:

responding to an interactive operation generated when the control point acts on other objects to be interacted with outside the region of interest.

10. An electronic device, comprising:

one or more processors;

a storage device for storing one or more programs;

wherein the one or more programs, when executed by the one or more processors, cause the one or more processors to implement:

receiving head control data for acting in the virtual reality scene;

determining a region of interest based on the head control data, and displaying the region of interest and a control point in the virtual reality scene, wherein the control point is initially located at a set position of the region of interest, and the region of interest includes an object to be interacted with;

receiving hand posture data generated in a hand operation region, wherein there is a displacement mapping relationship between the hand operation region and the region of interest;

moving the control point to a target display position, wherein the target display position is a mapping position of the hand posture data in the region of interest;

responding to an interactive operation generated when the control point acts on the object to be interacted with.

11. A non-transitory computer-readable storage medium having a computer program stored thereon, wherein the program, when executed by a processor, causes the processor to implement:

receiving head control data for acting in the virtual reality scene;

determining a region of interest based on the head control data, and displaying the region of interest and a control point in the virtual reality scene, wherein the control point is initially located at a set position of the region of interest, and the region of interest includes an object to be interacted with;

receiving hand posture data generated in a hand operation region, wherein there is a displacement mapping relationship between the hand operation region and the region of interest;

moving the control point to a target display position, wherein the target display position is a mapping position of the hand posture data in the region of interest;

responding to an interactive operation generated when the control point acts on the object to be interacted with.

12. The electronic device according to claim 10, wherein the one or more programs, when executed by the processor, cause the processor to further implement:

controlling the region of interest to move in the virtual reality scene as the received head control data changes;

in response to a movement attribute value of the region of interest after movement being less than a set threshold, keeping a display position of the control point unchanged;

in response to the movement attribute value being greater than or equal to the set threshold, resetting the control point to a center point of the region of interest after movement.

13. The electronic device according to claim 12, wherein, in response to the movement attribute value being greater than or equal to the set threshold, the one or more programs, when executed by the processor, cause the processor to further implement:

cancelling the displacement mapping between the hand operation region and the region of interest before movement, and re-establishing a displacement mapping relationship between the hand operation region with the region of interest after movement.

14. The electronic device according to claim 10, wherein the one or more programs, when executed by the processor, cause the processor to further implement:

upon receipt of a movement sensitivity adjustment operation, updating the displacement mapping relationship between the region of interest and the hand operation region;

upon receipt of new hand posture data, determining a mapping position of the hand posture data in the region of interest according to the updated displacement mapping relationship as a new target display position;

moving the control point to the new target display position.

15. The electronic device according to claim 10, wherein before responding to an interactive operation generated when the control point acts on the object to be interacted with, the one or more programs, when executed by the processor, cause the processor to further implement:

analyzing a triggering behavior of the control point on a trigger component, and generating an interactive operation acting on the object to be interacted with;

wherein the trigger component is at least one of the object to be interacted with and a trigger region formed by region expansion of the object to be interacted with.

16. The electronic device according to claim 10, wherein the one or more programs, when executed by the processor, cause the processor to further implement:

receiving out-of-region posture data generated outside the hand operation region;

moving the control point to an out-of-region display position, wherein the out-of-region display position is located outside the region of interest and is a scene mapping position of the out-of-region posture data relative to the virtual reality scene.

17. The non-transitory computer-readable storage medium according to claim 11, wherein the program, when executed by the processor, causes the processor to further implement:

controlling the region of interest to move in the virtual reality scene as the received head control data changes;

in response to a movement attribute value of the region of interest after movement being less than a set threshold, keeping a display position of the control point unchanged;

in response to the movement attribute value being greater than or equal to the set threshold, resetting the control point to a center point of the region of interest after movement.

18. The non-transitory computer-readable storage medium according to claim 17, wherein, in response to the movement attribute value being greater than or equal to the set threshold, the program, when executed by the processor, causes the processor to further implement:

cancelling the displacement mapping between the hand operation region and the region of interest before movement, and re-establishing a displacement mapping relationship between the hand operation region with the region of interest after movement.

19. The non-transitory computer-readable storage medium according to claim 11, wherein the program, when executed by the processor, causes the processor to further implement:

upon receipt of a movement sensitivity adjustment operation, updating the displacement mapping relationship between the region of interest and the hand operation region;

upon receipt of new hand posture data, determining a mapping position of the hand posture data in the region of interest according to the updated displacement mapping relationship as a new target display position;

moving the control point to the new target display position.

20. The non-transitory computer-readable storage medium according to claim 11, wherein before responding to an interactive operation generated when the control point acts on the object to be interacted with, the program, when executed by the processor, causes the processor to further implement:

analyzing a triggering behavior of the control point on a trigger component, and generating an interactive operation acting on the object to be interacted with;

wherein the trigger component is at least one of the object to be interacted with and a trigger region formed by region expansion of the object to be interacted with.

* * * * *